United States Patent [19]

Okada et al.

[11] Patent Number: 5,310,509
[45] Date of Patent: May 10, 1994

[54] DYE-CONTAINING LIGHT-POLARIZING FILM

[75] Inventors: Toyokazu Okada, Suita; Koji Higashi, Takatsuki; Shinjiro Kawasaki, Nishinomiya; Yutaka Nishii, Moriguchi, all of Japan

[73] Assignee: Sumitomo Chemical Company, Limited, Osaka, Japan

[21] Appl. No.: 993,891

[22] Filed: Dec. 18, 1992

Related U.S. Application Data

[63] Continuation of Ser. No. 381,750, Jun. 23, 1989, abandoned.

[30] Foreign Application Priority Data

| Nov. 2, 1987 | [JP] | Japan | 62-278078 |
| Nov. 2, 1987 | [JP] | Japan | 62-278079 |
| Jun. 30, 1988 | [JP] | Japan | 63-165382 |

[51] Int. Cl.$^5$ .............. F21V 9/14; G02B 5/30; C09B 45/24
[52] U.S. Cl. .................... 252/585; 359/490; 534/713; 534/716; 534/719
[58] Field of Search ............ 252/582, 585; 534/713, 534/716, 719; 359/490

[56] References Cited

U.S. PATENT DOCUMENTS

| 4,128,544 | 12/1978 | Schneider | 534/716 |
| 4,514,559 | 4/1985 | Sato et al. | 252/585 |
| 5,007,942 | 4/1991 | Claussen et al. | 252/585 |

FOREIGN PATENT DOCUMENTS

| 0021372 | 1/1981 | European Pat. Off. | 534/716 |
| 0182632 | 5/1986 | European Pat. Off. | |
| 2116008 | 4/1971 | Fed. Rep. of Germany | 534/716 |
| 47-34523 | 11/1972 | Japan | |
| 61-255304 | 11/1986 | Japan | |
| 62-156602 | 11/1987 | Japan | |
| 63-189803 | 8/1988 | Japan | |

*Primary Examiner*—Philip Tucker
*Attorney, Agent, or Firm*—Stevens, Davis, Miller & Mosher

[57] ABSTRACT

The present invention relates to a dye-containing light-polarizing film wherein a disazo dye represented by the formula (I) is used:

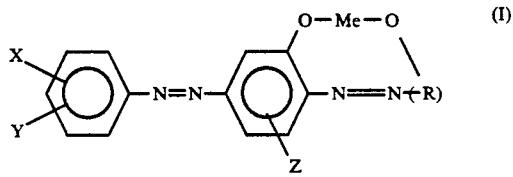

wherein Me represents a transition metal, being copper, nickel, zinc or iron, R represents a 1-naphthol or 2-naphthol residue which is bonded to azo group at the position adjacent to its hydroxyl group forming a complex bond together with the transition metal and which may have a substituent such as a sulfonic acid, sulfonamide, amino, acylamino or arylamino group or a hydroxyl group not adjacent to the azo group, X and Y represent a hydrogen atom, a $C_1$–$C_4$ alkyl, lower alkoxy, carboxylic acid, sulfonic acid, sulfonamide, sulfonalkylamide, amino, acrylamino or nitro group or a halogen atom, and Z represents a hydrogen atom or a $C_1$–$C_4$ alkyl or lower alkoxy group, said formula (I) having from 1 to 3 sulfonic acid groups.

Said dye-containing light-polarizing film, as compared with the conventional ones, not only exhibits a high durability, but also has excellent polarization performance enough to be comparable to the light-polarizing films in which iodine is used. Consequently, said dye-containing light-polarizing film is effectively used for use in displays in which liquid crystals are used and optical instruments including CRT filters.

26 Claims, No Drawings

DYE-CONTAINING LIGHT-POLARIZING FILM

This application is a continuation of application Ser. No. 07/381,750, filed Jun. 23, 1989 now abandoned.

TECHNICAL FIELD

The present invention relates to a dye-containing light-polarizing film of high durability and high performance.

TECHNICAL BACKGROUND

At the present time, a light-polarizing film is generally produced by the adsorption of a light polarizing element such as iodine or dichroic dyes into a stretched and oriented film made of polyvinyl alcohol or its derivatives, or into an oriented polyene film prepared by dehydrochlorinating a polyvinyl chloride film or dehydrating a polyvinyl alcohol film to form a polyene structure in these films.

Of these light-polarizing films, those in which iodine is used as a polarizing element are poor in resistance to moisture and heat although they are excellent in the initial polarization performance. Consequently, when they are used for a long period of time in high-temperature and high-humidity conditions, their durability becomes a problem. In order to improve the durability, there have been proposed various methods, for example a method of strengthening by treatment of these films with aqueous solutions containing formalin or boric acid, a method of using as a protecting film a high-polymer film which is low in permeability to moisture, and the like. However, the durability is still unsatisfactory in high-temperature and high humidity conditions.

Light-polarizing films in which a dichloric dye is used as a polarizing element are superior in the resistance to moisture and heat as compared with those in which iodine is used as a polarizing element. They are however inferior in the polarization performance as compared with the latter. Further, some of them change considerably in color under high temperature conditions depending upon the dyes used.

An object of the present invention is to solve the foregoing problems inherent to the prior arts, thereby providing a light-polarizing film which changes in color only with difficulty even under high temperature conditions and has a high performance.

DISCLOSURE OF THE INVENTION

The present inventors have extensively studied solutions to the foregoing problems, and as result, have attained to the present invention.

The present invention provides a dye-containing light-polarizing film comprising a dichroic dye absorbed into a high polymer film, characterized in that said dichroic dye is a copper-, nickel-, zinc- or iron-containing disazo dye represented by the formula (I) as a free acid,

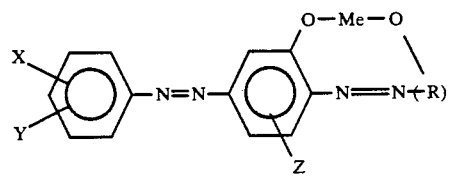

wherein Me represents a transition metal, being copper, nickel, zinc or iron, R represents a 1-naphthol or 2-naphthol residue which is bonded to azo group at the position adjacent to the hydroxyl group forming a complex bond together with the transition metal and may have a substituent such as a sulfonic acid, sulfonamide, amino, acylamino or arylamino group or a hydroxyl group not adjacent to the azo group, X and Y represent a hydrogen atom, a $C_1$-$C_4$ alkyl, lower alkoxy, carboxylic acid, sulfonic acid, sulfonamide, amino, acylamino or nitro group or a halogen atom, and Z represents a hydrogen atom or a $C_1$-$C_4$ alkyl or lower alkoxy group, said formula (I) having from 1 to 3 sulfonic acid groups, and also provides said dye-containing light-polarizing film showing a neutral gray, characterized in that at least one of said disazo dyes is used in combination with a dye showing absorption in a particular wavelength region. The present inventors have found that, by using said copper-, nickel-, zinc- or iron-containing disazo dyes, there can be obtained light-polarizing films which not only show no color change under high temperature conditions, but also have a wide light-absorbing region and an improved dichroism, i.e. polarization performance, of the dyes themselves, and besides which have such a high durability and a high polarization performance as have never been seen in the conventional light-polarizing films. Particularly, the present invention is very useful for producing light-polarizing films showing a neutral gray.

The copper-, nickel-, zinc- or iron-containing disazo dyes used in the present invention can easily be produced, for example, by the method described below: A compound represented by the formula (C),

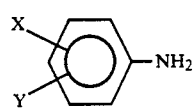

wherein X and Y represent the same meanings as described in the formula (I), is diazotized as usual and coupled with a compound represented by the formula (D),

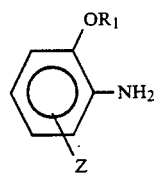

wherein $R_1$ represents a hydrogen atom or a lower alkyl group, and Z represents the same meaning as described in the formula (I). And then the coupling product is diazotized as usual and coupled with a compound represented by the formula (E) or (F) to obtain the disazo dyes:

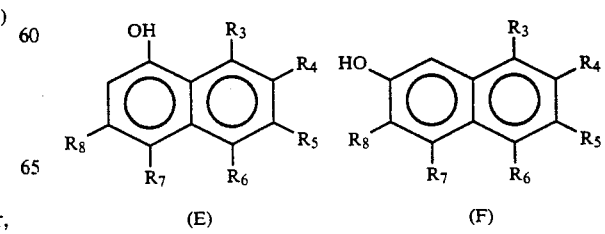

wherein $R_3$ to $R_8$ represent a hydrogen atom or a sulfonic acid, sulfonamide, amino, acylamino, arylamino or hydroxyl group, provided that $R_8$ in the formula (E) does not include the hydroxyl group.

The compound of the formula (C) used in the present invention includes for example aniline, m- or p-toluidine, 2,4- or 3,5-xylidine, sulfanilic acid, sulfanilamide, sulfanilmethylamide, metanilic acid, metanilamide, p-aminobenzoic acid, anthranilic acid, anisidine, p-aminoacetanilide, etc. The compound of the formula (D) includes for example o-aminophenol, o-anisidine, p-cleandine, 2,5-dimethoxyaniline, etc. The compound of the formula (E) includes for example α-naphthol, NW-acid, AW-acid, AW-acid amide, ε-acid, γ-acid, phenyl-γ-acid, J-acid, phenyl-J-acid, benzoyl-J-acid, acetyl-J-acid, H-acid, N-acetyl-H-acid, N-benzoyl-H-acid, chromotropic acid, etc. The compound of the formula (F) includes for example β-naphthol, Schäffer's acid, Schäffer's acid amide, R-acid, G-acid, etc.

These disazo dyes are easily converted to a copper complex by the following method, and thus the water-soluble copper-containing disazo dyes used in the present invention can be obtained.

For example, a disazo dye to be converted to a copper complex is dissolved or dispersed in water or a mixed solvent of water and a hydrophilic solvent (e.g. ethylene glycol, methyl cellosolve). Then, in an alkaline state, preferably in the presence of ammonia, monoethanolamine or diethanolamine, an aqueous solution of copper sulfate, copper chloride or copper acetate, preferably a tetramine copper salt is caused to act on the resulting solution or dispersion at a temperature of from 50° to 100° C., preferably not lower than 90° C. thus, the desired copper-containing disazo dyes can be obtained.

The water-soluble nickel-containing disazo dyes, water-soluble zinc-containing ones and water-soluble iron-containing ones used in the present invention can be obtained as follows: That is, a disazo dye to be converted to a complex is dissolved or dispersed in water or a mixed solvent of water and a hydrophilic solvent (e.g. ethylene glycol, methyl cellosolve). In an alkaline state, preferably in the presence of ammonia, monoethanolamine or diethanolamine, an aqueous solution of nickel sulfate, nickel chloride, nickel acetate, zinc sulfate, zinc chloride, iron sulfate or iron chloride is caused to act on the resulting solution or dispersion at a temperature of from 50° to 100° C., preferably not lower than 90° C. thus, the desired water-soluble nickel-containing, zinc-containing or iron-containing disazo dyes can be obtained.

Also, the desired nickel-, zinc- or iron-containing disazo dyes can be obtained advantageously, for example, by subjecting the copper-containing disazo dyes obtained above to copper-removing treatment under heating in a dilute hydroxchloric acid and converting the resulting O,O'-dihydroxy disazo dyes containing no metal to the nickel-, zinc- or iron-complex by the method described above.

Specific examples of the copper-, nickel-, zinc- and iron-containing disazo dyes of the formula (I) thus obtained will be shown as a free acid by means of the formulae (1) to (34). The dichroic dyes represented by the formulae (1) to (34) are usually used as a sodium salt, but it is also possible to use them in the form of a lithium, potassium, ammonium, ethanolamine or alkylamine salt or the like

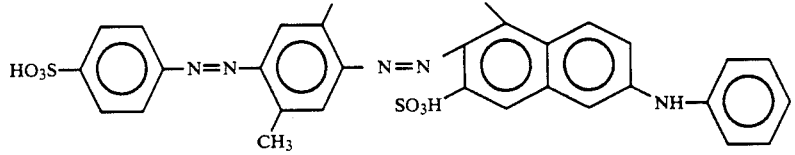

(1)

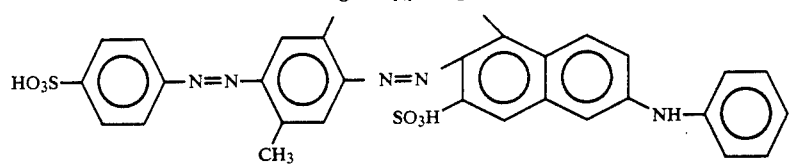

(2)

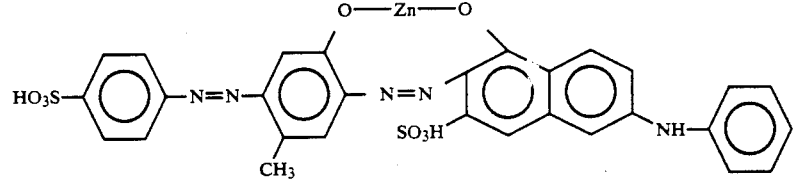

(3)

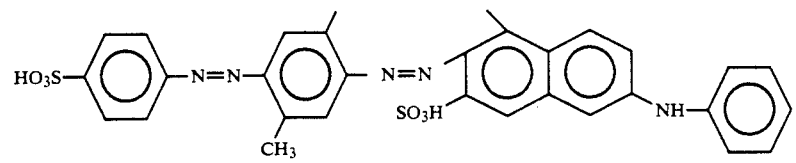

(4)

-continued
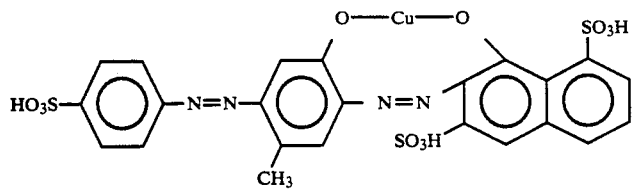  (5)
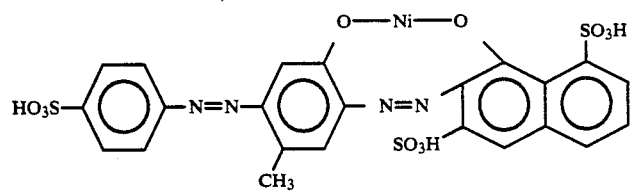  (6)
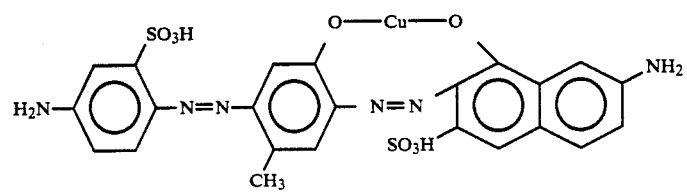  (7)
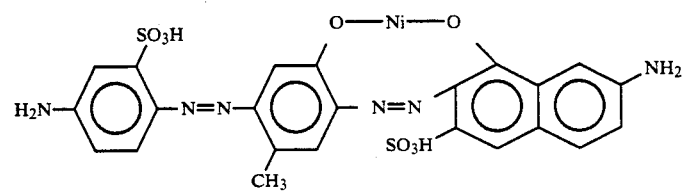  (8)
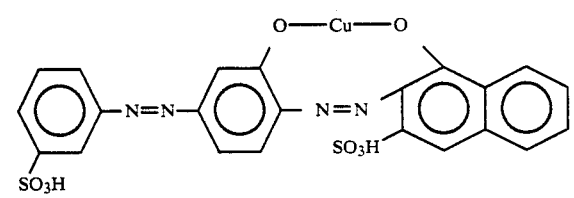  (9)
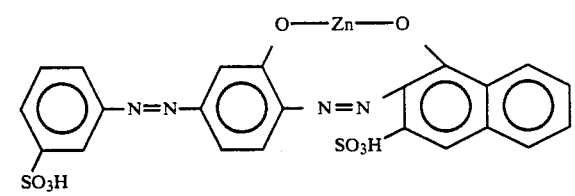  (10)
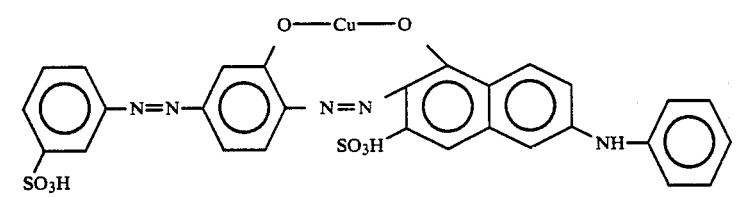  (11)
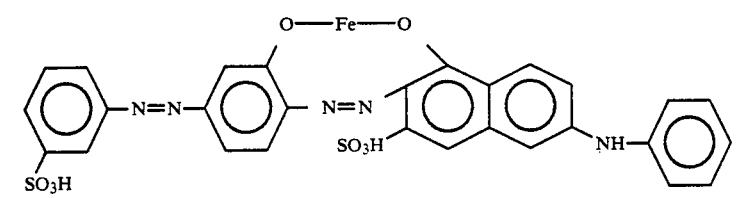  (12)

-continued
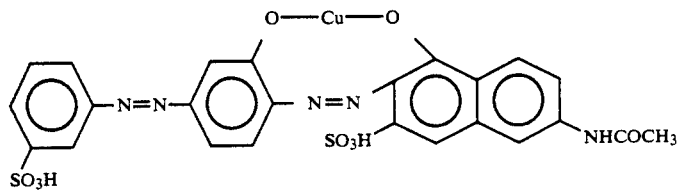
(13)
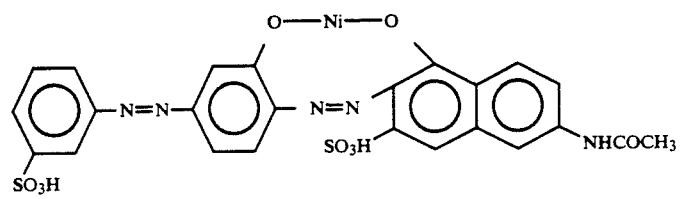
(14)
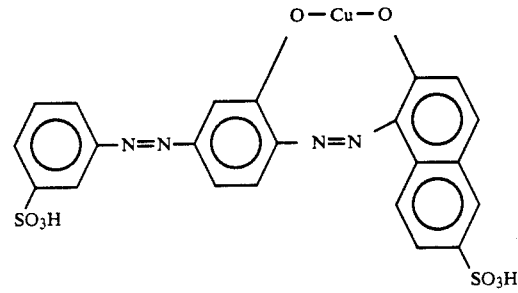
(15)
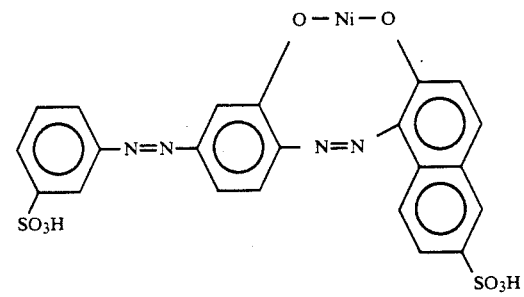
(16)
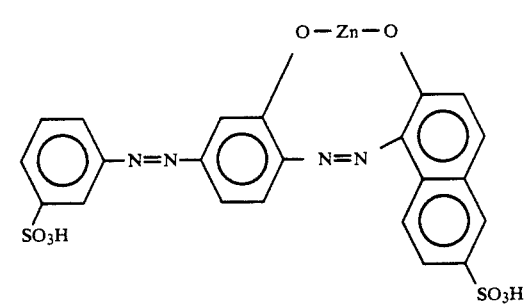
(17)
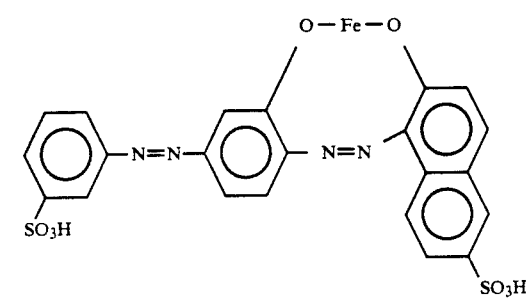
(18)

-continued
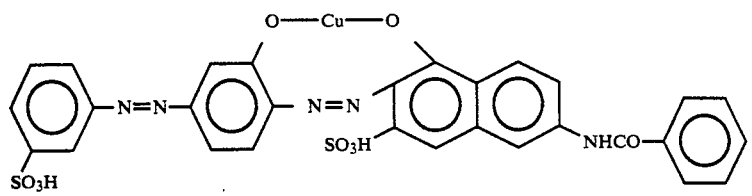
(19)
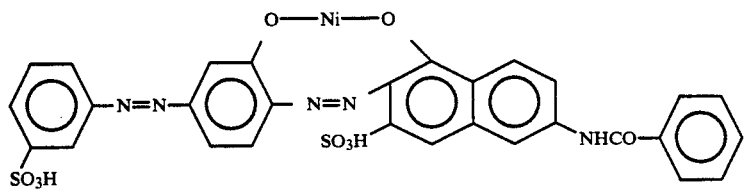
(20)
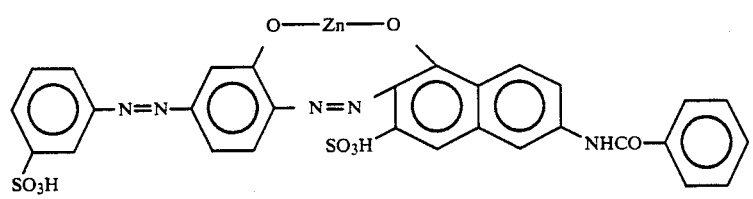
(21)
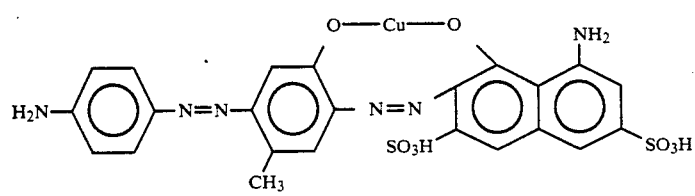
(22)
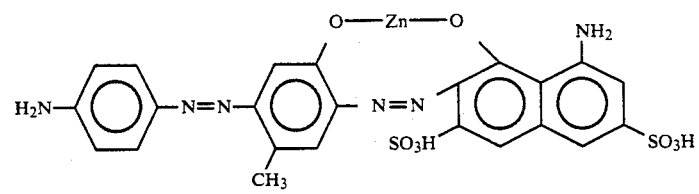
(23)
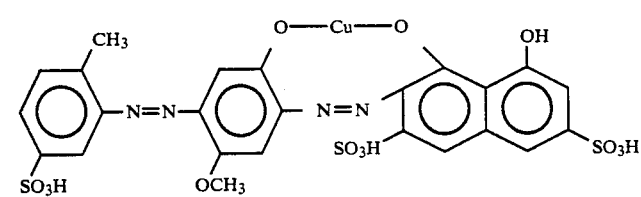
(24)
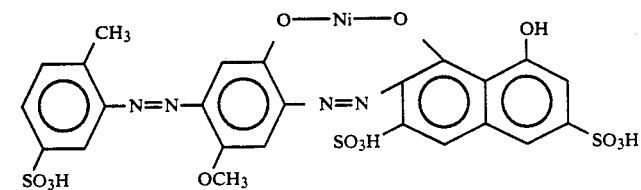
(25)

-continued
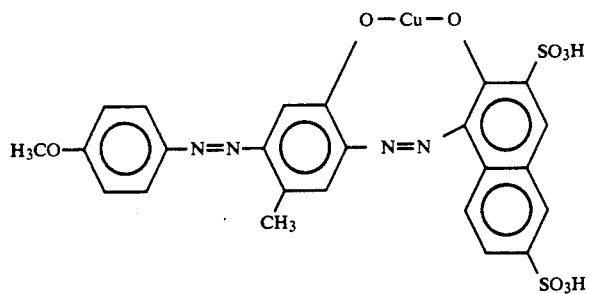
(26)
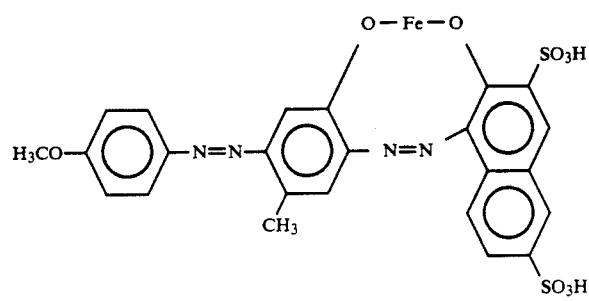
(27)
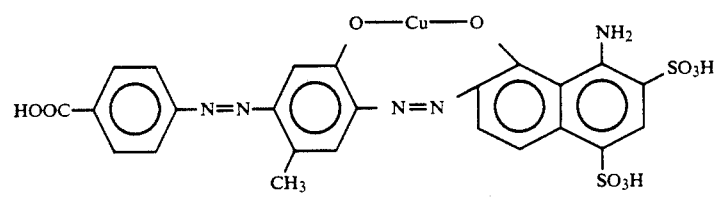
(28)
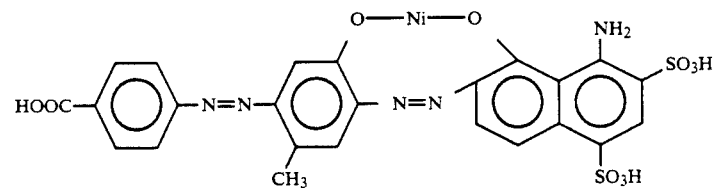
(29)
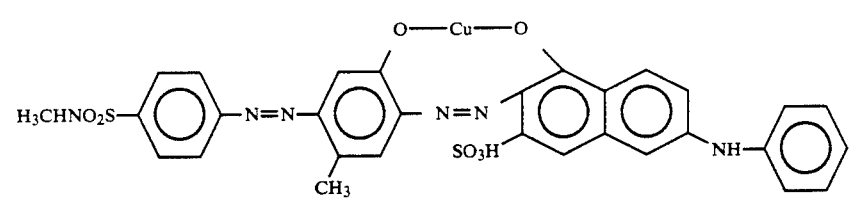
(30)
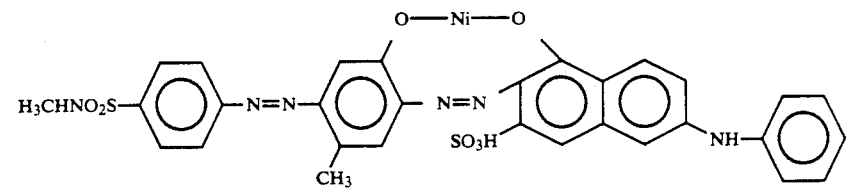
(31)
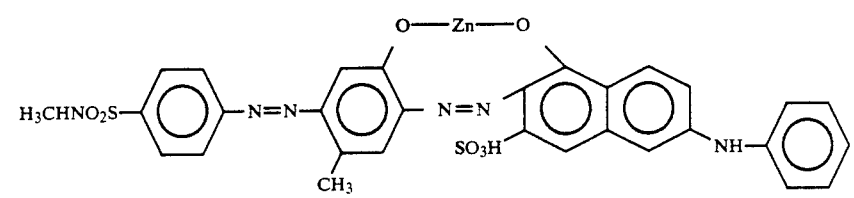
(32)

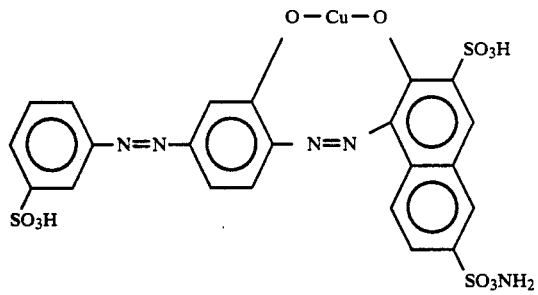

(33)

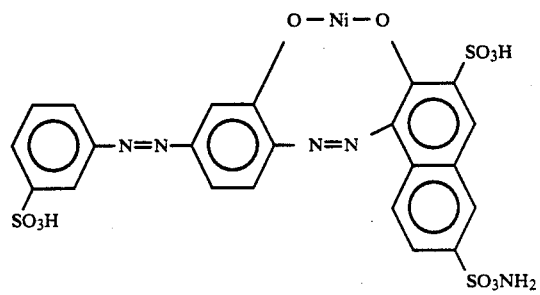

(34)

In the present invention, by using the dyes represented by the formula (I) in combination with a dye showing absorption in a particular wavelength region, correction of the color and an improvement in the polarization performance can be attained. The dye used in this case is one having absorption characteristics in the wavelength region different from that the copper-, nickel-, zinc- or iron-containing disazo dyes used in the present invention. As such the dye, any of those having a high dichroism will do, but generally, it is selected from azo dyes. As examples of such the dye used in the present invention, there are mentioned the following ones, as expressed by Color Index Generic Name (C.I. Generic Name):

C.I. Direct Yellow 12
C.I. Direct Blue 202
C.I. Direct Red 31
C.I. Direct Violet 9
C.I. Direct Yellow 44
C.I. Direct Yellow 28
C.I. Direct Orange 107
C.I. Direct Red 79
C.I. Direct Blue 71
C.I. Direct Blue 78
C.I. Direct Red 2
C.I. Direct Red 81
C.I. Direct Violet 51
C.I. Direct Orange 26
C.I. Direct Red 247
C.I. Direct Blue 168
C.I. Direct Green 85
C.I. Direct Brown 223
C.I. Direct Brown 106
C.I. Direct Yellow 142
C.I. Direct Blue 1

The high polymer film used in the present invention includes films made of polyvinyl alcohol or its derivatives, films made of the modified products of polyvinyl alcohol or its derivatives with an olefin (e.g. ethylene, propylene) or an acid (e.g. crotonic acid, acrylic acid, methacrylic acid, maleic acid) and films made of EVA resin (ethylene/vinyl acetate resin), saponified EVA resin, nylon resin, polyester resin, etc. Of these films, those which are made of polyvinyl alcohol or its derivative, because they are easy to adsorb dyes, are particularly useful as high polymer films.

In the present invention, for causing these high polymer films to adsorb the foregoing copper-, nickel-, zinc- or iron-containing disazo dyes, there can generally be employed a method of dissolving the copper-, nickel-, zinc- or iron-containing disazo dye in water and dyeing the high-polymer films with the resulting dye solution. In this case, a preferred dyeability is obtained by increasing the Glauber's salt concentration of the dye solution to from 2 to 10% and setting the dyeing temperature at from 50° to 70° C. The orientation of the dichloric dye adsorbed into the high polymer film is carried out by stretching the film before or after the adsorption of the dye. For stretching the film made of polyvinyl alcohol or its derivatives, any of methods in which compression and stretching are carried out by the wet form or dry form may be employed.

After adsorption of the foregoing copper-, nickel-, zinc- or iron-containing disazo dyes into the high polymer films and orientation of the films have been finished, when after-treatments such as boric acid treatment, etc are applied as need arises, the effect of the present invention becomes more remarkable. The boric acid treatment improves the light transmittance and degree of polarization of the light-polarizing film. The conditions of the boric acid treatment vary with the kind of the high polymer films used and that of the copper-, nickel-, zinc- or iron-containing disazo dyes. Generally, however, it is preferred that the boric acid concentration is in a range of from 1 to 15%, preferably from 5 to 10%, and that the treatment temperature is in a range of from 30° to 80° C., preferably from 50° to 75° C. When the boric acid concentration is lower than 1% and the treatment temperature is lower than 30° C., the effect of the treatment is poor. While when the boric acid concentration is higher than 15% and the treatment temperature is higher than 80° C., the light-polarizing film becomes brittle. Further, if necessary, a fixing treatment with aqueous solutions containing a cationic high-polymer compound may be applied in combination with the boric acid treatment.

The dye-containing light-polarizing film thus obtained is used as a polarizing plate after a protecting film superior in the feeling of optical transparency and mechanical strength has been stuck to one or both sides of the film.

As a material forming the protecting film, there are used the uniaxially stretched and oriented films of the conventionally used ones such as cellulose acetate films, acrylic films, fluorine-containing films (e.g. tetrafluoroethylene/hexafluoropropylene copolymer films) and films made of polyester resins, polyolefin resins, polyamide resins, etc.

The dye-containing light-polarizing film thus obtained, as compared with the conventional ones, not only exhibits a high durability over a long period of time even in high temperature conditions, but also has a high polarization performance enough to be comparable to the light polarizing films in which iodine is used. Consequently, the dye-containing light-polarizing film of the present invention is suitable for use in various indicators in which liquid crystals are used, particularly ones carried on vehicles requiring a high polarization performance and durability; and for use for the indication of industrial instruments used in various environments.

BEST MODE FOR CARRYING OUT THE INVENTION

The present invention will be illustrated in more detail with reference to the following examples, but these examples are only given for the purpose of illustration and not to be interpreted as limiting the present invention thereto.

The term "light transmittance" referred to herein means a value indicating the light transmittance of one piece of the light-polarizing film, measured by means of UV-330 spectrophotometer produced by Hitachi Ltd., in terms of Y according to JIS Z 8701 (Specification of Colours According to the CIE 1931 Standard Colorimetric System and the CIE 1964 Supplementary Standard Colorimetric System). The term "degree of polarization" means a value obtained by measuring the light transmittance of two pieces of the light-polarizing film superposed upon each other, expressing in Y according to the above method and then calculating according to the following equation:

$$\text{Degree of polarization} = \sqrt{\frac{Y\| - Y\bot}{Y\| + Y\bot}} \times 100(\%)$$

wherein $Y\|$ is a value of Y obtained from the light transmittance of two pieces of the light-polarizing film measured in a state wherein the both films are superposed upon each other so that they have the same orientation direction (this light transmittance is called "parallel light transmittance"), and $Y\bot$ is a value of Y obtained from the light transmittance of two pieces of the light-polarizing film measured in a state wherein the both films are superposed upon each other so that they have orientation directions which are at right angles to each other (this light transmittance is called "cross light transmittance"). The polarization performance is indicated by values measured on a particular wavelength for Examples 1 to 11 and Comparative examples 1 to 5, and by the mean of values measured on from 400 to 700 nm for Examples 12 to 21 and Comparative examples 6 and 7.

The durability in the present invention is indicated by $\Delta E^*$ described below. That is, $\Delta E^*$ is a value obtained by measuring the light transmittance of the light-polarizing film (measuring instrument; MCPD-100 spectrophotometer produced by Otsuka Denshi Co.), calculating the values of $L^*$, $a^*$ and $b^*$ according to JIS Z 8729 (Specification of Colour of Materials according to the CIE 1976 ($L^*a^*b^*$) Space and the CIE 1976 ($L^*u^*v^*$) Space) and substituting the resulting values in the following equation:

$$(\Delta E^*)i,j = (((\Delta L^*)i,j)^2 + ((\Delta a^*)i,j)^2 + ((\Delta b^*)i,j)^2)^{\frac{1}{2}}$$

wherein
$(\Delta L^*)i,j = (L^*)i - (L^*)j$
$(\Delta a^*)i,j = (a^*)i - (a^*)j$
$(\Delta b^*)i,j = (b^*)i - (b^*)j$
i: Before durability test
j: After durability test When this value exceeds 1, the color change is remarkable as compared with the initial color, becoming a problem in terms of the stability of the quality.

In the following examples, the dichroic dyes represented by the formulae (1) to (34) are used in the form of a sodium salt.

EXAMPLE 1

A polyvinyl alcohol film of 75 μm in thickness (Kuraray Vinylon ® #7500) was stretched to four times its original length in a longitudinal uniaxial direction to prepare the substrate of light polarizing film. The resulting film was dipped for 10 minutes, as kept in the tensioned state, in a 60° C. aqueous dye solution containing 0.15 wt. % of a copper-containing disazo dye represented by the formula (1) and 2.0 wt. % of Glauber's salt (sodium sulphate), a dyeing assistant. Thereafter, the film was dipped for 10 minutes in a 65° C. aqueous solution containing 7.5 wt. % of boric acid and then washed with 20° C. water for 30 seconds to obtain a light-polarizing film.

This light-polarizing film was measured for the polarization characteristics and $\Delta E^*$ when allowed to stand for 500 hours in a 100° C.-dry constant-temperature apparatus. The results are shown in Table 1.

COMPARATIVE EXAMPLE 1

According to the same method as in Example 1, the polyvinyl alcohol film was dipped for 10 minutes in a 60° C. aqueous dye solution containing 0.06 wt. % of a disazo direct type represented by the formula (35) and 1.0 wt. % of Glauber's salt and then subjected to the boric acid treatment to obtain a light-polarizing film.

This light-polarizing film was measured for the polarization characteristics and $\Delta E^*$ when allowed to stand for 500 hours in a 100° C.-dry constant-temperature apparatus. The results are shown in Table 1.

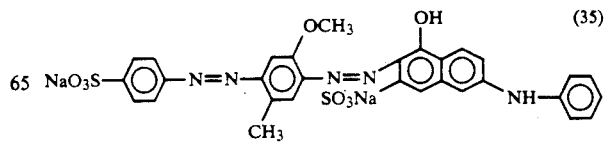

EXAMPLE 2

According to the same method as in Example 1, the polyvinyl alcohol film wa dipped for 30 minutes in a 60° C. aqueous dye solution containing 0.28 wt. % of a copper-containing disazo dye represented by the formula (7) and 4.0 wt. % of Glauber's salt and then subjected to the boric acid treatment to obtain a light-polarizing film.

This light-polarizing film was measured for the polarization characteristics and ΔE* when allowed to stand for 500 hours in a 100° C.-dry constant-temperature apparatus. The results are shown in Table 1.

COMPARATIVE EXAMPLE 2

According to the same method as in Example 1, the polyvinyl alcohol film was dipped for 15 minutes in a 60° C. aqueous dye solution containing 0.03 wt. % of a disazo dye represented by the formula (36) and 1.0 wt. % of Glauber's salt and then subjected to the boric acid treatment to obtain a light-polarizing film.

This light-polarizing film was measured for the polarization characteristics and ΔE* when allowed to stand for 500 hours in a 100° C.-dry constant-temperature apparatus. The results are shown in Table 1.

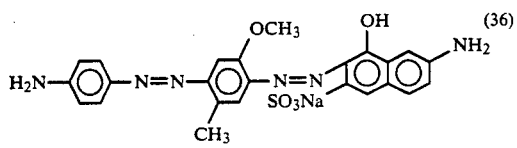
(36)

EXAMPLE 3

According to the same method as in Example 1, the polyvinyl alcohol film was dipped for 10 minutes in a 60° C. aqueous dye solution containing 0.75 wt. % of a copper-containing disazo direct dye represented by the formula (9) and 3.0 wt. % of Glauber's salt and then subjected to the boric acid treatment to obtain a light-polarizing film.

This light-polarizing film was measured for the polarization characteristics and ΔE* when allowed to stand for 500 hours in a 100° C.-dry constant-temperature apparatus. The results are shown in Table 1.

COMPARATIVE EXAMPLE 3

According to the same method as in Example 1, the polyvinyl alcohol film was dipped for 10 minutes in a 60° C. aqueous dye solution containing 0.03 wt. % of a disazo dye represented by the formula (37) and 1.0 wt. % of Glauber's salt and then subjected to the boric acid treatment to obtain a light-polarizing film.

This light-polarizing film was measured for the polarization characteristics and ΔE* when allowed to stand for 500 hours in a 100° C.-dry constant-temperature apparatus. The results are shown in Table 1.

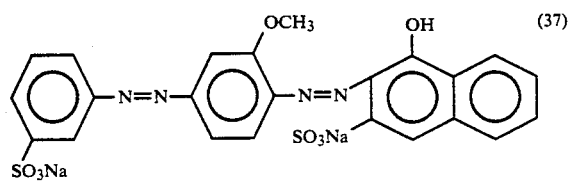
(37)

EXAMPLE 4

According to the same method as in Example 1, the polyvinyl alcohol film was dipped for 10 minutes in a 60° C. aqueous dye solution containing 0.50 wt. % of a copper-containing disazo dye represented by the formula (15) and 4.0 wt. % of Glauber's salt and then subjected to the boric acid treatment to obtain a light-polarizing film.

This light-polarizing film was measured for the polarization characteristics and ΔE* when allowed to stand for 500 hours in a 100° C.-dry constant-temperature apparatus. The results are shown in Table 1.

COMPARATIVE EXAMPLE 4

According to the same method as in Example 1, the polyvinyl alcohol film was dipped for 8 minutes in a 60° C. aqueous dye solution containing 0.04 wt. % of a disazo dye represented by the formula (38) and 1.0 wt. % of Glauber's salt and then subjected to the boric acid treatment to obtain a light-polarizing film.

This light-polarizing film was measured for the polarization characteristics and ΔE* when allowed to stand for 500 hours in a 100° C.-dry constant-temperature apparatus. The results are shown in Table 1.

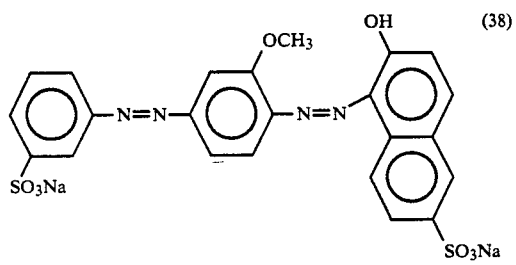
(38)

EXAMPLE 5

According to the same method as in Example 1, the polyvinyl alcohol film was dipped for 10 minutes in a 60° C. aqueous dye solution containing 0.14 wt. % of a copper-containing disazo dye represented by the formula (30) and 2.5 wt. % of Glauber's salt and then subjected to the boric acid treatment to obtain a light-polarizing film.

This light-polarizing film was measured for the polarization characteristics and ΔE* when allowed to stand for 500 hours in a 100° C.-dry constant-temperature apparatus. The results are shown in Table 1.

EXAMPLE 6

According to the same method as in Example 1, the polyvinyl alcohol film was dipped for 10 minutes in a 60° C. aqueous dye solution containing 0.025 wt. % of a nickel-containing disazo dye represented by the formula (2) and 2.0 wt. % of Glauber's salt. Thereafter, the film was dipped for 10 minutes in a 65° C. aqueous solution containing 7.5 wt. % of boric acid and then washed with a 20° C. water for 30 seconds to obtain a light-polarizing film. This light-polarizing film was measured for the polarization characteristics and ΔE* when allowed to stand for 500 hours in a 100° C.-dry constant-temperature apparatus. The results are shown in Table 1.

EXAMPLE 7

According to the same method as in Example 1, the polyvinyl alcohol film was dipped for 7 minutes in a 60° C. aqueous dye solution containing 0.025 wt. % of a zinc-containing disazo dye represented by the formula (3) and 2.0 wt. % of Glauber's salt and then subjected to the boric acid treatment to obtain a light-polarizing film. This light-polarizing film was measured for the polarization characteristics and $\Delta E^*$ when allowed to stand for 500 hours in a 100° C.-dry constant-temperature apparatus. The results are shown in Table 1.

EXAMPLE 8

According to the same method as in Example 1, the polyvinyl alcohol film was dipped for 9 minutes in a 60° C. aqueous dye solution containing 0.025 wt. % of a iron-containing disazo dye represented by the formula (4) and 2.0 wt. % of Glauber's salt and then subjected to the boric acid treatment to obtain a light-polarizing film. This light-polarizing film was measured for the polarization characteristics and $\Delta E^*$ when allowed to stand for 500 hours in a 100° C.-dry constant-temperature apparatus. The results are shown in Table 1.

COMPARATIVE EXAMPLE 5

According to the same method as in Example 1, the polyvinyl alcohol film was dipped for 5 minutes in a 60° C. aqueous dye solution containing 0.025 wt. % of a disazo dye represented by the formula (39) and 2.0 wt. % of Glauber's salt and then subjected to the boric acid treatment to obtain a light-polarizing film. This light-polarizing film, however, hardly exhibited the polarization characteristics. The results are shown in Table 1.

EXAMPLE 10

According to the same method as in Example 1, the polyvinyl alcohol film was dipped for 15 minutes in a 60° C. aqueous dye solution containing 0.15 wt. % of a zinc-containing disazo dye represented by the formula (17) and 4.0 wt. % of Glauber's salt and then subjected to the boric acid treatment to obtain a light-polarizing film. This light-polarizing film was measured for the polarization characteristics and $\Delta E^*$ when allowed to stand for 500 hours in a 100° C.-dry constant-temperature apparatus. The results are shown in Table 1.

EXAMPLE 11

According to the same method as in Example 1, the polyvinyl alcohol film was dipped for 18 minutes in a 60° C. aqueous dye solution containing 0.15 wt. % of a iron-containing disazo dye represented by the formula (18) and 4.0 wt. % of Glauber's salt and then subjected to the boric acid treatment to obtain a light-polarizing film. This light-polarizing film was measured for the polarization characteristics and $\Delta E^*$ when allowed to stand for 500 hours in a 100° C.-dry constant-temperature apparatus. The results are shown in Table 1.

EXAMPLE 12

According to the same method as in Example 1, the polyvinyl alcohol film was dipped for 7 minutes in a 60° C. aqueous dye solution containing 0.15 wt. % of a copper-containing disazo dye represented by the formula (5), 0.03 wt. % of C.I. Direct Yellow 12 and 2.0 wt. % of Glauber's salt. Thereafter, the film was washed with a 20° C. water for 20 seconds and treated for 10 minutes with a 65° C. aqueous solution containing

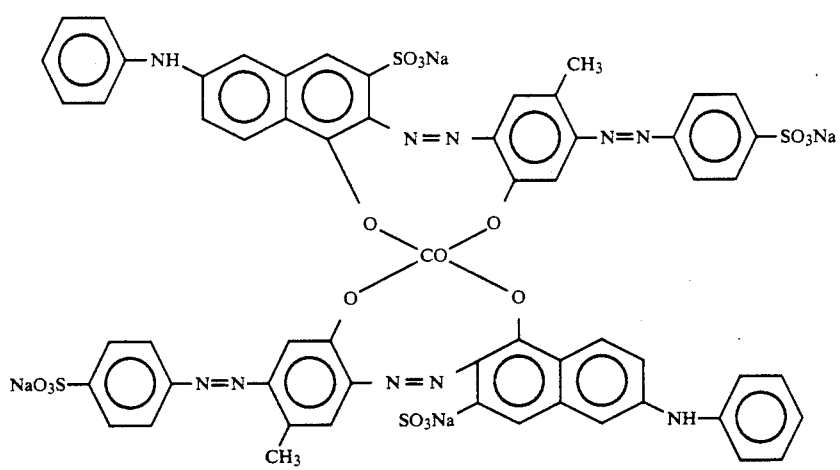

(39)

EXAMPLE 9

According to the same method as in Example 1, the polyvinyl alcohol film was dipped for 13 minutes in a 60° C. aqueous dye solution containing 0.15 wt. % of a nickel-containing disazo dye represented by the formula (16) and 4.0 wt. % of Glauber's salt and then subjected to the boric acid treatment to obtain a light-polarizing film. This light-polarizing film was measured for the polarization characteristics and $\Delta E^*$ when allowed to stand for 500 hours in a 100° C.-dry constant-temperature apparatus. The results are shown in Table 1.

7.5 wt. % of boric acid to obtain a light-polarizing film showing a neutral gray. The polarization characteristics of this light-polarizing film are shown in Table 2.

EXAMPLE 13

According to the same method as in Example 1, the polyvinyl alcohol film was dipped for 4 minutes in a 60° C. aqueous dye solution containing 0.28 wt. % of a disazo dye represented by the formula (1), 0.5 wt. % of C.I. Direct Red 2 and 2.0 wt. % of Glauber's salt. Thereafter, the film was washed with a 20° C. water for 20 seconds and treated for 10 minutes with a 65° C. aqueous solution containing 7.5 wt. % of boric acid to

21 obtain a light-polarizing film showing a neutral gray. The polarization characteristics of this light-polarizing film are shown in Table 2.

EXAMPLE 14

According to the same method as in Example 1, the polyvinyl alcohol film was dipped for 3 minutes in a 60° C. aqueous dye solution containing 0.33 wt. % of a copper-containing disazo dye represented by the formula (1), 0.2 wt. % of C.I. Direct Red 2 and 0.03 wt. % of C.I. Direct Yellow 12, 0.3 wt. % of C.I. Direct Blue 202 and 2.0 wt. % of Glauber's salt. Thereafter, the film was washed with a 20° C. water for 20 seconds and treated for 10 minutes with a 65° C. aqueous solution containing 7.5 wt. % of boric acid to obtain a light-polarizing film showing a neutral gray. The polarization characteristics of this light-polarizing film are shown in Table 2.

EXAMPLE 15

According to the same method as in Example 1, the polyvinyl alcohol film was dipped for 6 minutes in a 60° C. aqueous dye solution containing 0.2 wt. % of a copper-containing disazo dye represented by the formula (15), 0.2 wt. % of C.I. Direct Red 2 and 0.015 wt. % of C.I. Direct Yellow 12, 0.2 wt. % of C.I. Direct Blue 202 and 2.0 wt. % of Glauber's salt. Thereafter, the film was washed with a 20° C. water for 20 seconds and treated for 10 minutes with a 65° C. aqueous solution containing 7.5 wt. % of boric acid to obtain a light-polarizing film showing a neutral gray. The polarization characteristics of this light-polarizing film are shown in Table 2.

EXAMPLE 16

According to the same method as in Example 1, the polyvinyl alcohol film was dipped for 3 minutes in a 60° C. aqueous dye solution containing 0.27 wt. % of a copper-containing disazo dye represented by the formula (30), 0.2 wt. % of C.I. Direct Red 2 and 0.03 wt. % of C.I. Direct Yellow 12, 0.3 wt. % of C.I. Direct Blue 202 and 2.0 wt. % of Glauber's salt. Thereafter, the film was washed with a 20° C. water for 20 seconds and treated for 10 minutes with a 65° C. aqueous solution containing 7.5 wt. % of boric acid to obtain a light-polarizing film showing a neutral gray. The polarization characteristics of this light-polarizing film are shown in Table 2.

EXAMPLE 17

According to the same method as in Example 1, the polyvinyl alcohol film was dipped for 6 minutes in a 60° C. aqueous dye solution containing 0.045 wt. % of a nickel-containing disazo dye represented by the formula (6), 0.015 wt. % of C.I. Direct Yellow 12 and 2.0 wt. % of Glauber's salt. Thereafter, the film was washed with a 20° C. water for 20 seconds and treated for 10 minutes with a 65° C. aqueous solution containing 7.5 wt. % of boric acid to obtain a light-polarizing film showing a neutral gray. The polarization characteristics of this light-polarizing film are shown in Table 2.

EXAMPLE 18

According to the same method as in Example 1, the polyvinyl alcohol film was dipped for 4 minutes in a 60° C. aqueous dye solution containing 0.055 wt. % of a zinc-containing disazo dye represented by the formula (3), 0.08 wt. % of C.I. Direct Red 2 and 2.0 wt. % of Glauber's salt. The film was then subjected to the boric acid treatment to obtain a light-polarizing film showing a natural gray. The polarization characteristics of this light-polarizing film are shown in Table 2.

EXAMPLE 19

According to the same method as in Example 1, the polyvinyl alcohol film was dipped for 2.5 minutes in a 60° C. aqueous dye solution containing 0.06 wt. % of a nickel-containing disazo dye represented by the formula (2), 0.2 wt. % of C.I. Direct Red 2, 0.008 wt. % of C.I. Direct Yellow 12, 0.052 wt. % of C.I. Direct Blue 202 and 2.0 wt. % of Glauber's salt. The film was then subjected to the boric acid treatment to obtain a light-polarizing film showing a natural gray. The polarization characteristics of this light-polarizing film are shown in Table 2.

EXAMPLE 20

According to the same method as in Example 1, the polyvinyl alcohol film was dipped for 7 minutes in a 60° C. aqueous dye solution containing 0.05 wt. % of a iron-containing disazo dye represented by the formula (18), 0.045 wt. % of C.I. Direct Red 2, 0.005 wt. % of C.I. Direct Yellow 12, 0.055 wt. % of C.I. Direct Blue 202 and 2.0 wt. % of Glauber's salt. The film was then subjected to the boric acid treatment to obtain a light-polarizing film showing a natural gray. The polarization characteristics of this light-polarizing film are shown in Table 2.

EXAMPLE 21

According to the same method as in Example 1, the polyvinyl alcohol film was dipped for 2.5 minutes in a 60° C. aqueous dye solution containing 0.04 wt. % of a nickel-containing disazo dye represented by the formula (34), 0.037 wt. % of C.I. Direct Red 2, 0.007 wt. % of C.I. Direct Yellow 12, 0.052 wt. % of C.I. Direct Blue 202 and 2.0 wt. % of Glauber's salt. The film was then subjected to the boric acid treatment to obtain a light-polarizing film showing a natural gray. The polarization characteristics of this light-polarizing film are shown in Table 2.

COMPARATIVE EXAMPLE 6

According to the same method as in Example 1, the polyvinyl alcohol film was dipped for 8 minutes in a 60° C. aqueous dye solution containing 0.004 wt. % of C.I. Direct Yellow 12, 0.01 wt. % of C.I. Direct Black 17, 0.008 wt. % of C.I. Direct Blue 1 and 1.0 wt. % of Glauber's salt. The film was then subjected to the boric acid treatment to obtain a light-polarizing film showing a natural gray. This film, however, was inferior in the polarization performance to the light-polarizing films of the present invention. The polarization characteristics of this light-polarizing film are shown in Table 2.

TABLE 1

| | Wavelength used for measurement (nm) | Light transmittance (%) | Degree of polarization (%) | ΔE* |
| --- | --- | --- | --- | --- |
| Example 1 | 610 | 41.5 | 98.6 | 0.73 |
| Comparative example 1 | 570 | 42.0 | 93.8 | 2.90 |
| Example 2 | 680 | 41.3 | 96.8 | 0.69 |
| Comparative example 2 | 610 | 41.9 | 92.1 | 2.55 |
| Example 3 | 590 | 41.4 | 95.0 | 0.92 |
| Comparative example 3 | 560 | 41.5 | 90.3 | 1.98 |

TABLE 1-continued

| | Wavelength used for measurement (nm) | Light transmittance (%) | Degree of polarization (%) | ΔE* |
|---|---|---|---|---|
| Example 4 | 570 | 40.0 | 94.8 | 0.78 |
| Comparative example 4 | 550 | 41.0 | 84.6 | 2.62 |
| Example 5 | 610 | 42.0 | 97.2 | 0.75 |
| Example 6 | 600 | 41.3 | 98.5 | 0.72 |
| Example 7 | 600 | 41.8 | 97.6 | 0.80 |
| Example 8 | 600 | 41.0 | 97.1 | 0.77 |
| Comparative example 5 | 600 | 42.3 | 1.5 | — |
| Example 9 | 570 | 40.2 | 94.5 | 0.80 |
| Example 10 | 570 | 41.4 | 92.6 | 0.82 |
| Example 11 | 570 | 40.8 | 92.3 | 0.76 |

TABLE 2

| | Wavelength used for measurement (nm) | Light transmittance (%) | Degree of polarization (%) |
|---|---|---|---|
| Example 12 | 400~700 | 42.3 | 91.3 |
| Example 13 | 400~700 | 41.6 | 97.3 |
| Example 14 | 400~700 | 42.0 | 98.2 |
| Example 15 | 400~700 | 42.1 | 94.9 |
| Example 16 | 400~700 | 42.1 | 97.0 |
| Example 17 | 400~700 | 41.6 | 92.0 |
| Example 18 | 400~700 | 41.5 | 96.7 |
| Example 19 | 400~700 | 41.5 | 98.4 |
| Example 20 | 400~700 | 42.0 | 95.2 |
| Example 21 | 400~700 | 41.8 | 97.3 |
| Comparative example 6 | 400~700 | 41.6 | 90.5 |

APPLICABILITY IN INDUSTRY

The dye-containing light-polarizing film obtained in the present invention, as compared with the conventional ones, not only exhibits a high durability over a long period of time even under high-temperature conditions, but also has excellent polarization performance enough to be comparable to the light-polarizing films in which iodine is used. Consequently, the dye-containing light-polarizing film of the present invention is effectively used for use in various displays in which liquid crystals are used, particularly ones carried on vehicles requiring a high polarization performance and durability; for use for the indication of industrial instruments used in various environments; and besides for use in optical instruments including CRT filters, etc.

What is claimed is:

1. A dye-containing light-polarizing film comprising a dichroic dye absorbed into a high polymer film, in which said dichroic dye is a water-soluble copper-, nickel-, zinc- or iron-containing diazo dye represented by formula (I) as a free acid

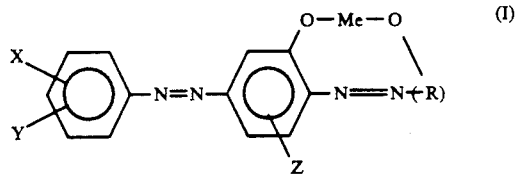

wherein Me represents a transition metal selected from the group consisting of copper, nickel, zinc and iron; R represents a 1-naphthol or 2-naphthol residue which is bonded to the azo group at the position adjacent to the hydroxyl group forming a complex bond together with the transition metal and which may have a substituent selected from the group consisting of sulfonic acid, sulfonamide, amino, acylamino, arylamino and hydroxyl not adjacent to the azo group; X and Y represent hydrogen, $C_1$-$C_4$ alkyl, lower alkoxy, carboxylic acid, sulfonic acid, sulfonamide, amino, acylamino, nitro or halogen; and Z represents hydrogen, $C_1$-$C_4$ alkyl or lower alkoxy; said formula (I) having from 1 to 3 sulfonic acid groups.

2. A dye-containing light-polarizing film showing a neutral gray comprising a dichroic dye adsorbed into a high polymer film, in which said dichroic dye is used in combination with an organic direct dye having absorption in a particular wave length region, wherein said dichroic dye is at least one of water-soluble copper-, nickel-, zinc- and iron-containing diazo dyes represented by formula (I) as a free acid,

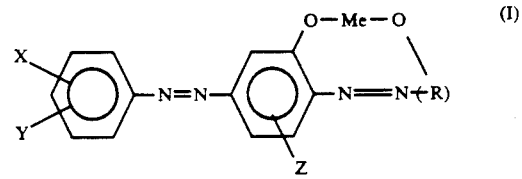

wherein Me represents a transition metal selected from the group consisting of copper, nickel, zinc and iron; R represents a 1-naphthol or 2-naphthol residue which is bonded to the azo group at the position adjacent to the hydroxyl group forming a complex bond together with the transition metal and which may have a substituent selected from the group consisting of sulfonic acid, sulfonamide, amino, acylamino, arylamino and hydroxyl not adjacent to the azo group; X and Y represent hydrogen, $C_1$-$C_4$ alkyl, lower alkoxy, carboxylic acid, sulfonic acid, sulfonamide, amino, acylamino, nitro or halogen; and Z represents hydrogen, $C_1$-$C_4$ alkyl or lower alkoxy; said formula (I) having from 1 to 3 sulfonic acid groups.

3. A dye-containing light-polarizing film according to claim 1, wherein the high polymer film is a film comprising polyvinyl alcohol or its derivatives.

4. A dye-containing light-polarizing film according to claim 2, wherein the high polymer film is a film comprising polyvinyl alcohol or its derivatives.

5. A dye-containing light-polarizing film according to claim 1, wherein, in formula (I), at least one of X and Y is sulfonic acid.

6. A dye-containing light-polarizing film according to claim 2, wherein, in formula (I), at least one of X and Y is sulfonic acid.

7. A dye-containing light-polarizing film according to claim 1, wherein, in formula (I), at least one of the substituents of R is sulfonic acid.

8. A dye-containing light-polarizing film according to claim 2, wherein, in formula (I), at least one of the substituents of R is sulfonic acid.

9. A dye-containing light-polarizing film according to claim 1, wherein, in formula (I), R is a 1-naphthol residue having at least one sulfonic acid group.

10. A dye-containing light-polarizing film according to claim 2, wherein, in formula (I), R is a 1-naphthol residue having at least one sulfonic acid group.

11. A dye-containing light-polarizing film according to claim 1, wherein, in formula (I), at least one of substituents X and Y other than hydrogen is present in the para-position to the azo bond, and at least one of the substituents of R other than hydrogen is present in the 6-position.

12. A dye-containing light-polarizing film according to claim 2, wherein, in formula (I), at least one of substituents X and Y other than hydrogen is present in the para-position to the azo bond, and at least one of the substituents of R other than hydrogen is present in the 6-position.

13. A dye-containing light-polarizing film comprising a dichroic dye adsorbed into a high polymer film, in which said dichroic dye is a water-soluble copper-, nickel-, zinc- or iron-containing diazo dye represented by formula (I) as a free acid
wherein Me represents a transition metal selected from the group consisting of copper, nickel, zinc and iron; R represents a 1-naphthol or 2-naphthol residue which is bonded to the azo group at the position adjacent to the hydroxyl group forming a complex bond together with the transition metal and which may have a substituent selected from the group consisting of sulfonic acid, sulfonamide, amino, acylamino, arylamino and hydroxyl not adjacent to the azo group; X and Y represent hydrogen, $C_1$–$C_4$ alkyl, lower alkoxy, carboxylic acid, sulfonic acid, sulfonamide, amino or acylamino, and Z represents hydrogen, $C_1$–$C_4$ alkyl or lower alkoxy; said formula (I) having from 1 to 3 sulfonic acid groups.

14. A dye-containing light-polarizing film showing a neutral gray comprising a dichroic dye adsorbed into a high polymer film, in which said dichroic dye is used in combination with an organic direct dye having absorption in a particular wave length region,
wherein said dichroic dye is at least one of water-soluble copper-, nickel-, zinc- and iron-containing diazo dyes represented by formula (I) as a free acid,

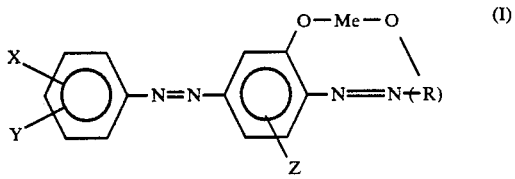

wherein Me represents a transition metal selected from the group consisting of copper, nickel, zinc and iron; R represents a 1-naphthol or 2-naphthol residue which is bonded to the azo group at the position adjacent to the hydroxyl group forming a complex bond together with the transition metal and which may have a substituent selected from the group consisting of sulfonic acid, sulfonamide, amino, acylamino, arylamino and hydroxyl not adjacent to the azo group; X and Y represent hydrogen, $C_1$–$C_4$ alkyl, lower alkoxy, carboxylic acid, sulfonic acid, sulfonamide, amino or acylamino; and Z represents hydrogen, $C_1$–$C_4$ alkyl or lower alkoxy; said formula (I) having from 1 to 3 sulfonic acid groups.

15. A dye-containing light-polarizing film according to claim 13, wherein the high polymer film is a film comprising polyvinyl alcohol or its derivatives.

16. A dye-containing light-polarizing film according to claim 14, wherein the high polymer film is a film comprising polyvinyl alcohol or its derivatives.

17. A dye-containing light-polarizing film according to claim 13, wherein, in formula (I), at least one of X and Y is sulfonic acid.

18. A dye-containing light-polarizing film according to claim 14, wherein, in formula (I), at least one of X and Y is sulfonic acid.

19. A dye-containing light-polarizing film according to claim 13, wherein, in formula (I), at least one of the substituents of R is sulfonic acid.

20. A dye-containing light-polarizing film according to claim 14, wherein, in formula (I), at least one of the substituents of R is sulfonic acid.

21. A dye-containing light-polarizing film according to claim 13, wherein, in formula (I), R is 1-naphthol residue having at least one sulfonic acid group.

22. A dye-containing light-polarizing film according to claim 14, wherein, in formula (I), R is a 1-naphthol residue having at least one sulfonic acid group.

23. A dye-containing light-polarizing film according to claim 13, wherein, in formula (I), at least one of substituents X and Y other than hydrogen is present in the para-position to the azo bond, and at least one of the substituents of R other than hydrogen is present in the 6-position.

24. A dye-containing light-polarizing film according to claim 14, wherein, in formula (I), at least one of substituents X and Y other than hydrogen is present in the para-position to the azo bond, and at least one of the substituents of R other than hydrogen is present in the 6-position.

25. A dye-containing light-polarizing film comprising a dichroic dye adsorbed into a high polymer film, in which said dichroic dye is a water-soluble nickel-, zinc- or iron-containing diazo dye represented by formula (I) as a free acid

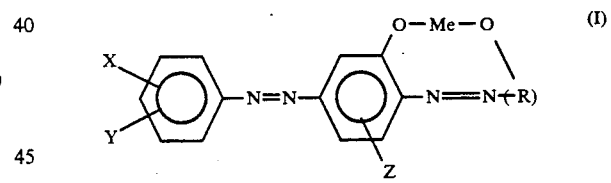

wherein Me represents a transition metal selected from the group consisting of nickel, zinc and iron; R represents a 1-naphthol or 2-naphthol residue which is bonded to the azo group at the position adjacent to the hydroxyl group forming a complex bond together with the transition metal and which may have a substituent selected from the group consisting of sulfonic acid, sulfonamide, amino, acylamino, arylamino and hydroxyl not adjacent to the azo group; X and Y represent nitro or halogen, and Z represents hydrogen, $C_1$–$C_4$ alkyl or lower alkoxy; said formula (I) having from 1 to 3 sulfonic acid groups.

26. A dye-containing light-polarizing film showing a neutral gray comprising a dichroic dye adsorbed into a high polymer film, in which said dichroic dye is used in combination with an organic direct dye having absorption in a particular wave length region,
wherein said dichroic dye is at least one of water-soluble nickel-, zinc- and iron-containing diazo dyes represented by formula (I) as a free acid,

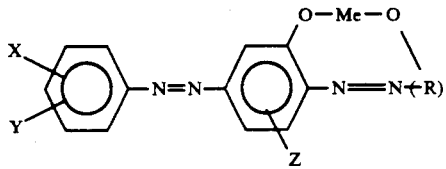

wherein Me represents a transition metal selected from the group consisting of nickel, zinc and iron; R represents a 1-naphthol or 2-naphthol residue which is bonded to the azo group at the position adjacent to the hydroxyl group forming a complex bond together with the transition metal and which may have a substituent selected from the group consisting of sulfonic acid, sulfonamide, amino, acylamino, arylamino and hydroxyl not adjacent to the azo group, X and Y represent nitro or halogen; and Z represents hydrogen, $C_1$–$C_4$ alkyl or lower alkoxy; said formula (I) having from 1 to 3 sulfonic acid groups.

* * * * *